United States Patent [19]

Rusz et al.

[11] 3,913,379

[45] Oct. 21, 1975

[54] DYNAMIC GAS ANALYZER

[76] Inventors: Tibor Rusz, 3033 Doyne Road, Pasadena, Calif. 91107; Elliott Jacobson, 237 Carolwood Drive, Arcadia, Calif. 91006

[22] Filed: Oct. 18, 1973

[21] Appl. No.: 407,540

[52] U.S. Cl............................ 73/27 R; 128/2.08
[51] Int. Cl.[2]........................................ G01N 25/18
[58] Field of Search................. 73/27 R, 23, 204; 128/2.08, 2 C, 188, 2.07; 340/237 R, 239 R

[56] References Cited
UNITED STATES PATENTS

| | | | |
|---|---|---|---|
| 1,691,600 | 11/1928 | Brush et al............................ | 73/204 |
| 3,251,361 | 5/1966 | Rusz..................................... | 128/188 |
| 3,465,753 | 9/1969 | Levy et al............................ | 73/23 X |
| 3,474,660 | 10/1969 | Dooley................................. | 73/27 R |
| 3,765,239 | 10/1973 | Olsson .......................... | 128/2.08 X |

*Primary Examiner*—Richard C. Queisser
*Assistant Examiner*—Stephen A. Kreitman
*Attorney, Agent, or Firm*—Christie, Parker & Hale

[57] ABSTRACT

A gas analyzer that is sensitive to gas composition and registers changes in gas composition without the usual time delay provides for establishing a no flow condition for a short interval of time, circuitry for producing an electrical signal having a base value dependent upon the thermal conductivity of the gas during the no flow condition, and circuitry for detecting the base value and translating it into an output indicative of the composition of the gas.

9 Claims, 5 Drawing Figures

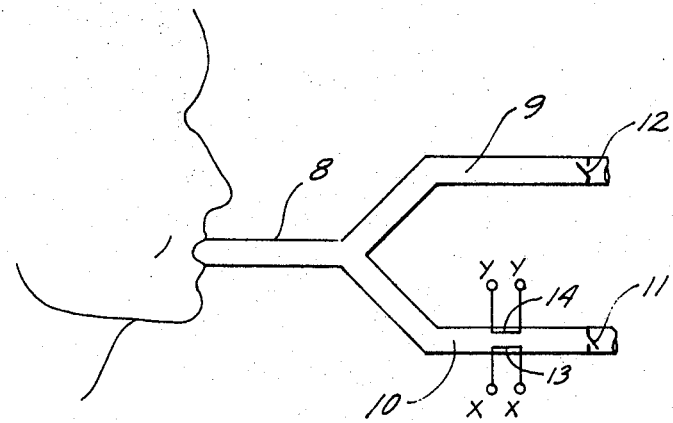
FIG_1
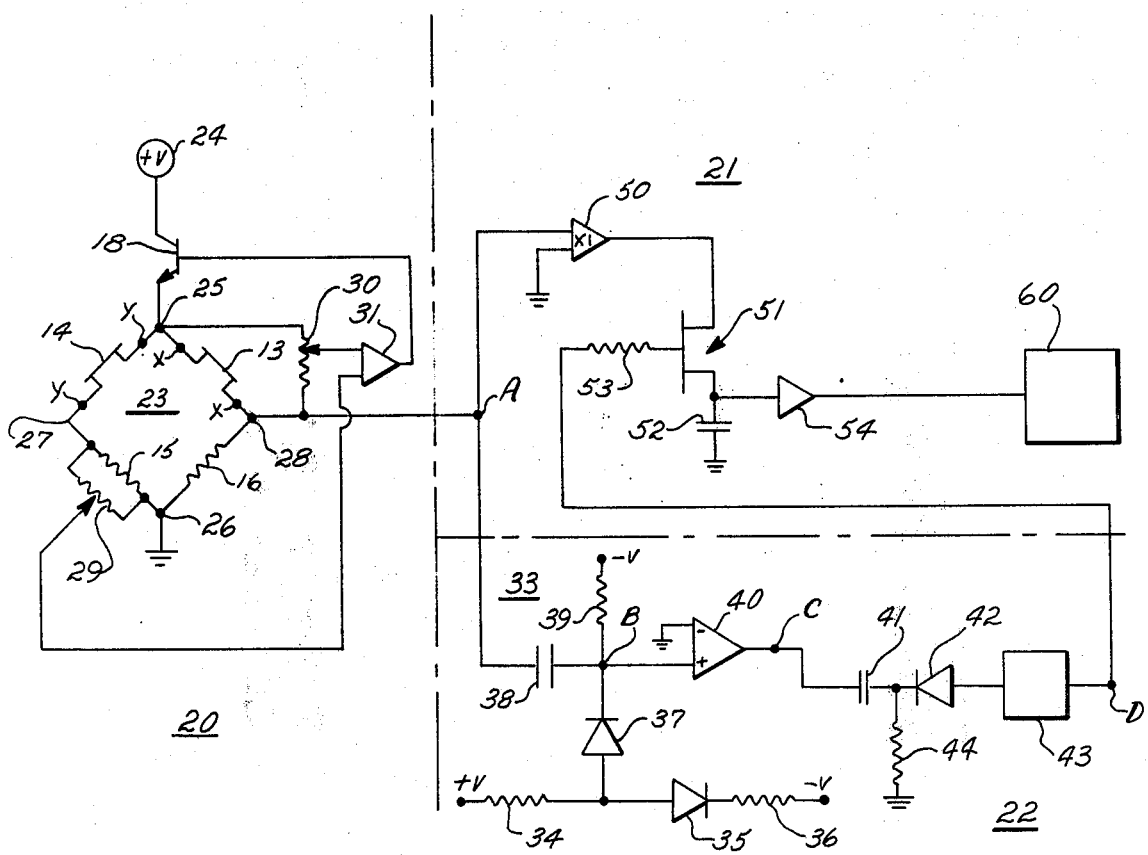
FIG_2

DYNAMIC GAS ANALYZER

BACKGROUND OF THE INVENTION

1. Field of the Invention

This invention relates to gas analyzers and more particularly to a method and apparatus for rapidly determining the composition of a gas by monitoring the thermal conductivity of the gas.

The knowledge of the composition of a gas is extremely important in many fields and in some of these fields it is desirable to know the gas composition on a real time basis. For example, in the medical field, it is desirable to know the composition of the gases in a patient's lungs during the application of a gaseous anesthetic.

2. Description of the Prior Art

Most, if not all, Katharometer type gas analyzers used in medical instrumentation consist of a double cell arrangement, one for reference gas, usually sealed, and the other for the gas to be analyzed. Within the cells are sensors, typically thermistors or platinum wires heated to a predetermined temperature with an electrical current. A pump draws the unknown gas into the sample cell and as the gas composition changes therein, the temperature of the sensor also changes according to the different thermal conductivity of the gas. The sensors in each cell form part of a Wheatstone bridge and the magnitude of the unbalance between the sensors produced by the gas being analyzed is proportional to the gas concentration as it affects the thermal conductivity of the gas once the instrument is properly calibrated.

The response time of this type of gas analyzer is relatively slow and requires several seconds before a measurement can be made. Additionally, these gas analyzers are bulky, cumbersome and expensive as they require connecting tubing and pumps, and are not capable of responding to instantaneous changes in the composition of the gas.

The ability to follow changes in composition of the respiratory gas would be very useful in the field of anesthesiology whereby the application of a gaseous anesthetic could be more closely controlled. Additionally, in many other fields it is desirable to have a rapid response analyzer that is both light weight and relatively inexpensive.

SUMMARY OF THE INVENTION

The method and apparatus of the present invention result in a gas analyzer that has a very short response time and provides instantaneous indications of the composition of the gas being analyzed.

The gas to be analyzed in accordance with this invention either naturally has intermittent unidirectional flow or is caused to have intermittent unidirectional flow so that for at least a part of the time there is zero flow of the gas.

The method of this invention comprises the steps of generating an analog electrical signal having a base level or substantially static magnitude during each no flow interval in response to the thermal conductivity of the gas being analyzed. This substantially static magnitude is digitally sampled and held, and indicates the composition of the gas. The gas analyzer for performing the method of this invention comprises means for providing through a passage intermittent unidirectional flow of the gas to be analyzed, a transducer having a sensor in the path of the gas flow in the passage for producing a time-varying analog electrical signal having a reference level or magnitude dependent upon the thermal conductivity of the gas during the interval of no gas flow and circuit means for measuring the reference level or magnitude established during each interval of no gas flow.

The transducer may advantageously comprise a bridge circuit having a first electrical resistance element of a first platinum wire heated to a predetermined temperature. This element has a resistance that varies in response to the flow of the gas and a base resistance during each no flow condition that is dependent upon the conductivity of the gas and the ambient temperature thereof.

The bridge circuit further includes a second electrical resistance element of a second platinum wire having a temperature resistance characteristic that is the same as the temperature resistance characteristic of the first wire and having a resistance that is dependent upon the ambient temperature to provide thermal compensation for the transducer.

The circuit for measuring the base level resistance during each no flow condition comprises a logic and timing section and a sample and hold section. The logic and timing section includes a DC restorer circuit, a null detector and a logic circuit for producing a sample control signal in response to the occurrence of zero gas flow. The sample and hold circuit in response to each sample control signal, samples the output signal from the transducer during each no flow interval and produces an instantaneous updated output signal representing the thermal conductivity of the gas being analyzed.

A utilization means may be coupled to the output of the sample and hold circuit for indicating the composition of the gas in response to the output signal.

BRIEF DESCRIPTION OF THE DRAWING

The above and other features and advantages of the present invention may be understood more fully and clearly upon consideration of the following specification and drawing in which:

FIG. 1 is a schematic representation of a passage for intermittent unidirectional gas flow;

FIG. 2 is a schematic diagram of a dynamic gas analyzer used with a sensor such as those in the passage of FIG. 1 in accordance with the present invention;

DETAILED DESCRIPTION OF THE PREFERRED EMBODIMENT

Figure 3:
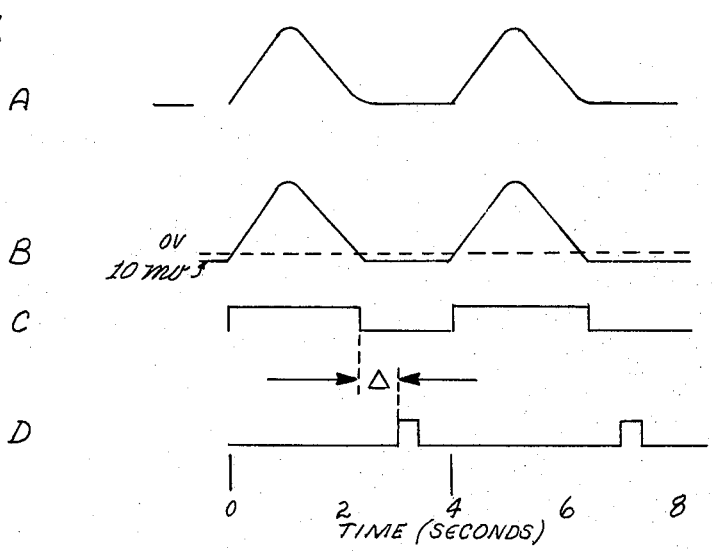
FIG. 3 is a chart depicting the electrical signals at various points in the gas analyzer of FIG. 2 and useful in an understanding of the invention.

The method and apparatus for analyzing the composition of a gas in accordance with this invention are useful in many fields. However, for purposes of illustration they will be disclosed in the context of the medical field.

In one application of a gas analyzer in the medical field, a patient may be receiving nitrous oxide ($N_2O$) as an anesthetic and it is desirable that the composition of the gas in the lungs be known on a real time basis.

Gases have a certain thermal conductivity that is dependent upon the composition thereof. Air, for example, has a thermal conductivity of $583 \times 10^{-7}$ calories per cubic centimeter times seconds squared. The thermal conductivity of some other gases to the same measure of conductivity is:

| | |
|---|---|
| Carbon dioxide ($CO_2$) | $352 \times 10^{-7}$ |
| Helium (He) | $3480 \times 10^{-7}$ |
| Nitrous oxide ($N_2O$) | $380 \times 10^{-7}$ |

The above are a few of the gases that may be present in human breathing, especially when a person is under medical treatment or examination.

The gas within the lungs of a patient may be analyzed by causing the patient to breathe through a tube 8 having passages 9 and 10 or by causing a portion of the gas to be passed through a passage, such as passage 10, in which sensors are located, as diagrammatically shown in FIG. 1. The patient may either breathe directly into a tube 8 or a portion of the gases from a patient's respiration may be caused to flow through the passage 10 in some manner rather than having a patient exhale directly into the tube 8. In any event, the gases passing through the passage 10 are unidirectional in that a one-way valve 11, which is diagrammatically shown in FIG. 1, is positioned in the passage 10 and a similar valve 12 is positioned in passage 9 so that the gas flows in only one direction in each passage.

A sensor 13 which advantageously may be a fine platinum wire is positioned in the passage 10. This sensor 13 is electrically heated to a carefully controlled temperature above the ambient temperature, therefore its resistance varies in response to gas flow, gas composition and gas temperature in the passage 10.

A second resistance element 14 which also advantageously may be a platinum wire is positioned close to sensor 13 in the same passage 10. This sensor 14 is not heated, therefore is only responsive to ambient temperature and is used for temperature compensation of the bridge in which both sensors 13 and 14 are connected. In this combination sensor 13 therefore is responsive only to gas flow and gas composition. In the intermittent gas flow through passage 10 during the no flow phase the resistance of sensor 13 depends only upon the thermal conductivity of the gas in which it is suspended.

The gas analyzer of the present invention is shown schematically in FIG. 2 and comprises a transducer 20, a detection circuit 21, and a logic and timing circuit 22 which are separated by the dashed-lines in FIG. 2. The transducer 20 includes a bridge circuit 23 in which the active sensing element 13 is connected in one leg and the temperature compensating element 14 is connected in the adjacent leg. A resistor 15 is connected in a third leg and a resistor 16 is connected in the fourth leg of the bridge 23.

Current is supplied to the bridge circuit 23 from a positive voltage source 24 through the collector-emitter junction of a transistor 18. The bridge circuit 23 has a pair of input nodes 25 and 26 and a pair of output nodes 27 and 28. A high resistance potentiometer 29 is connected across resistor 15 and a high resistance potentiometer 30 is connected across the active sensor 13. A signal is taken from between the wiper arms of potentiometers 29 and 30 and applied to a differential amplifier 31 having an output connected to the base of transistor 18 and thereby controlling the magnitude of the current through the transistor 18 and bridge circuit 23.

A selected resistance ratio between active element 13 and temperature compensating element 14 is maintained by varying the current through the bridge circuit 23 under the control of high-gain amplifier 31 and transistor 18. A time varying analog electrical output signal is developed between output node 28 and ground reference and appears at point A in the circuit of FIG. 2.

Figure 4:
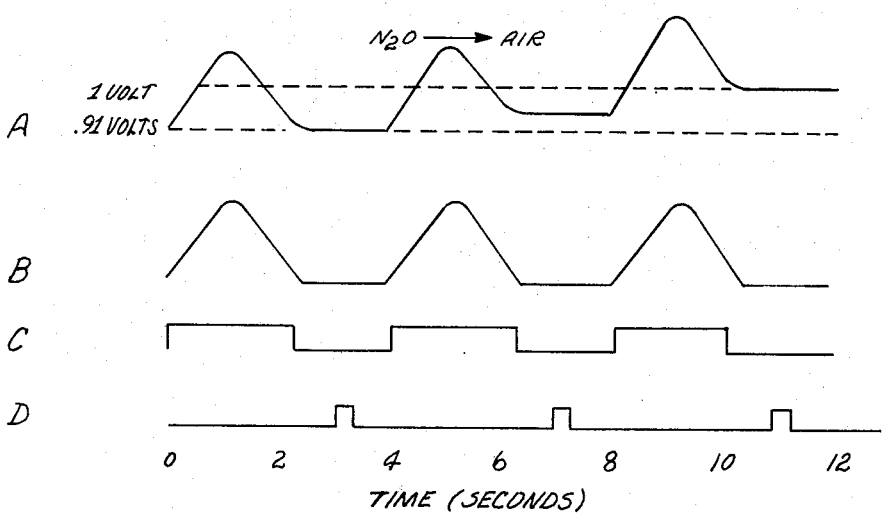
FIG. 4 is a chart depicting electrical signals at various points in the gas analyzer of FIG. 2 when the composition of the gas is changing and has an increase in thermal conductivity.
Figure 5:
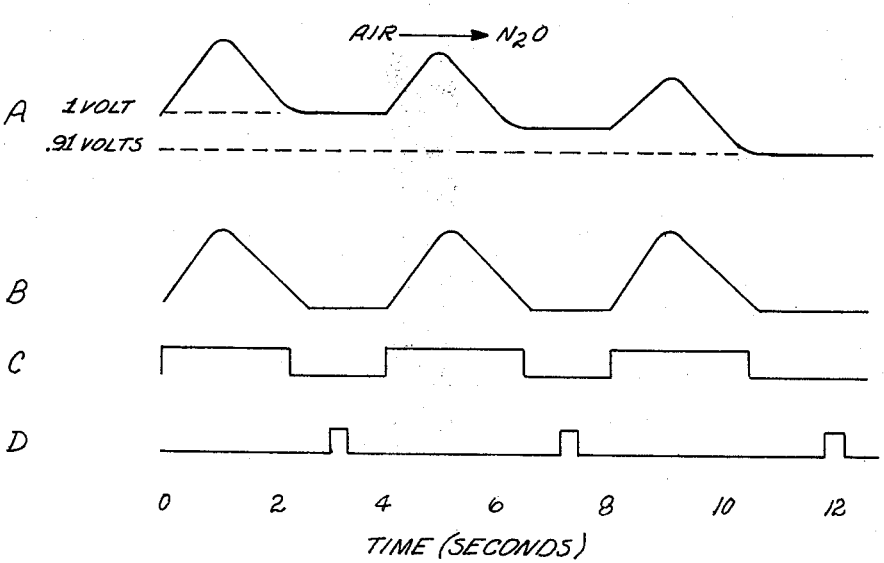
FIG. 5 is a chart depicting electrical signals similar to the chart of FIG. 4 where the composition of the gas being analyzed is changing and the thermal conductivity thereof is decreasing.

The output signal for either the inspiratory phase or expiratory phase of breathing will produce a signal having a waveform such as curve A in FIG. 3. The time intervals in the charts of FIGS. 3 through 5 are representative and are not to be limiting. As is known, the inspiratory phase of respiration is generally shorter than the expiratory phase and the respiratory rate which varies from person to person may increase or decrease depending upon the condition of the person being examined or under medical treatment.

The reference for curve A in FIG. 3 may be any level and in one operative device, a reference level of 1-volt was selected for air and the reference level varied thereafter, depending upon the percentages of other gases present. With a reference level of 1-volt for air, the reference level for nitrous oxide is 0.91 volts and for helium is 2.2 volts. Thus, by detecting the reference level of the output signal at point A, the percentage of nitrous oxide or helium in the air may be determined.

The signal at point A is applied to a DC restorer 33, which references the signal to a given voltage level, which in this case is a slightly negative voltage to cause the signal applied to cross zero in returning to its base position. The DC restorer includes a voltage divider of a resistor 34, diode 35 and a resistor 36 connected in series between a known positive voltage and a known negative voltage. The cathode of the diode 35 is connected to the resistor 34 which is connected to the positive voltage and the anode of diode 35 is connected to resistor 36 which is connected to the negative voltage.

A selected voltage is established at the junction between resistor 34 and diode 35. The junction of resistor 34 and diode 35 is connected through a diode 37 to one side of a capacitor 38, the other side of which is connected to point A and couples the signal at point A into the DC restorer 33. The junction of capacitor 38 and diode 37 is labeled point B and is connected to a negative voltage through a resistor 39. The DC restorer 33 in conjunction with the balance of the logic and timing circuit 22 determines when to examine the input signals at point A to measure the reference level of this signal. When the signal at point A is changing, which is during the interval of gas flow through the passage 10, the change is coupled through the capacitor 38 and appears at point B as shown in curve B of FIG. 3.

The voltage at point B is coupled to a differential amplifier 40 which has one output level for input signals at point B above zero volts and another output level for input signals at point B below zero volts. The voltage at the junction of resistor 34 and diode 35 is held at a selected negative voltage, such as negative 10 millivolts, to assure reliability by requiring the signal at point B to cross zero volts thereby indicating the end of gas flow and the beginning of a no flow condition.

Curve C in FIG. 3 represents the output signal from amplifier 40. Amplifier 40 is a high gain amplifier and therefore the transitions between levels are relatively rapid. The output of amplifier 40 is coupled through an integrating capacitor 41 and a diode 42 to a monostable multivibrator 43. A resistor 44 is coupled between the junction of capacitor 41 and diode 42 and ground reference. The monostable multivibrator 43 is triggered by the negative transition of the signal at the output of amplifier 40. The output signal from the monostable multivibrator 43 may occur substantially instantaneously with the negative transition or at a selected interval $\Delta$ after the transition. Additionally, the duration of the pulse at the output of the multivibrator 43 may be varied to sample for a longer interval the signal representative of the thermal conductivity and composition of the gas being analyzed. In any event, the duration of this pulse is sufficient to permit the signal from the transducer to be sensed.

The output of monostable multivibrator 43 is coupled to the sample and hold circuit 21. The sample and hold circuit 21 shown in schematic form in FIG. 2 is typical of sample and hold circuits. Other sample and hold circuits are described at pages 6–26 and 6–27 of the text, "Computer Handbook", edited by Huskey and Korn and published by McGraw-Hill Book Company, Inc. in 1962. The sample and hold circuit 21 has an input from the transducer 20 at point A. This input is coupled through a buffer amplifier 50 and a controllable switch 51 to a capacitor 52.

The controllable switch 51 is controlled by the sample control signal at point D which is applied through a resistor 53 to the controllable switch which may be a field effect transistor switch, as shown in FIG. 2. One side of the capacitor 52 is connected to ground reference while the side that is connected to the switch 51 is connected through a high input impedance isolation amplifier 54 to a utilization means 60.

When a person is breathing at 15 breaths per minute, the expiratory phase of the respiration produces a signal having a waveform represented by curve A in FIG. 3 at the output of the transducer 20. The changing signal, during the interval when gas is flowing through the passage 10, is coupled through capacitor 38 and appears at point B. The waveform of the signal at point B is representatively shown by curve B in FIG. 3. When the signal at point B crosses the zero reference, the output level of the differential amplifier 40 changes and produces a signal having the waveform of curve C in FIG. 3.

Each negative transition of the signal at point C triggers the monostable multivibrator 43 which has a built-in delay $\Delta$, after which time an output pulse as shown in curve D of FIG. 3, is produced. The output pulse is the sample control pulse which closes the switch 51 to apply the signal at point A through buffer amplifier 50 to the capacitor 52. Since the sample control signal occurs during the no flow condition as represented by the reference level of the signal at point A, the reference level is presented to the capacitor 52. Thus, the charge on the capacitor 52 represents the reference level of the signal at point A.

As noted above, nitrous oxide has a reference level of 0.91 volts while air has a reference level of 1 volt. Thus, a change from nitrous oxide to air will produce a signal having the waveform of curve A of FIG. 4. It is to be recognized that the gas from a person's breathing will not be 100 percent nitrous oxide but for purposes of illustration it is shown in FIG. 4 how a change from nitrous oxide to air may be detected by the gas analyzer of FIG. 2. Additionally, the change from pure nitrous oxide to pure air will generally not be as rapid as shown in FIG. 4. However, the principle of operation of the gas analyzer may be understood from the curves of FIGS. 4 and 5.

The reference level signal of 0.91 volts, representing a gas of nitrous oxide, is applied to the capacitor 52 upon the application of the sample control signal at point D to the switch 51. The next time the sample control signal is applied to the switch 51, the reference level will have increased to some point between 0.91 volts and 1 volt if air is mixed with the nitrous oxide. Eventually the reference level will again be 1 volt when there is no nitrous oxide in the gas and the gas is composed entirely of air.

Similarly, when the gas changes from air to nitrous oxide, the curves of FIG. 5 will result at the various points in the gas analyzer of FIG. 2. Thus, the gas analyzer of FIG. 2 provides a signal that may be applied to the utilization means 60. The utilization means may take many forms and one form is a meter calibrated to indicate a gas of 100 percent air, a gas of 100 percent nitrous oxide, or the percentage of nitrous oxide in the air, for example. The indication is on an updated basis and essentially instantaneous with any change in the composition of the gas being analyzed.

Various modifications may be made to the details of the gas analyzer of FIG. 2 without departing from the spirit and scope of this invention which is defined by the following claims.

What is claimed is:

1. Apparatus for analyzing the composition of a gas, which comprises:

a unidirectional gas flow passage for the gas to flow through intermittently to provide alternating time intervals of gas flow and no-flow conditions;

transducer means having a sensor positioned in the passage for producing a time-varying analog electrical signal that during each gas flow interval has a magnitude affected by both the gas flow rate and the thermal conductivity of the gas and during each no-flow interval has a magnitude directly representative of said thermal conductivity;

first circuit means responsive to variations in the time-varying electrical analog signal for producing a digital sample control signal to indicate the end of each gas flow interval; and second circuit means enabled by each sample control signal to detect the magnitude of the time-varying analog electrical signal during each succeeding no-flow interval.

2. Apparatus according to claim 1, wherein the first circuit means comprises a triggerable monostable multivibrator for producing the sample control signal, and triggering circuitry responsive to the time-varying electrical analog signal for triggering the monostable multivibrator.

3. Apparatus according to claim 2 wherein the triggering circuitry includes a D.C. restorer circuit and a zero crossing detector connected in tandem between the transducer means and the monostable multivibrator.

4. Apparatus according to claim 1, wherein the first circuit means comprises a triggerable monostable multivibrator, and a D.C. restorer circuit and a zero crossing detector connected in tandem between the transducer means and the multivibrator, and wherein the multivibrator produces the sample control signal a selected interval of time after the zero crossing detector detects a zero crossing.

5. Apparatus according to claim 1 wherein the second circuit means comprises:
   a storage element,
   a controllable switch responsive to the sample control signal for coupling the time-varying electrical analog signal to the storage element to enable the magnitude of the time-varying electrical analog signal during the no-flow interval to be stored in the storage element, and
   a high impedance isolation amplifier for coupling the stored signal to a utilization means.

6. Apparatus according to claim 1, further comprising:
   means for indicating the composition of the sampled gas as represented by the magnitude of the time-varying electrical analog signal during each no-flow interval.

7. Apparatus according to claim 1, wherein the transducer means comprises:
   a bridge circuit having a first electrical resistance element of a first platinum wire having current flowing through it so as to be heated to a first predetermined temperature and having a resistance change in response to the intermittent gas flow across the wire and a base level resistance in response to the thermal conductivity of the gas, and a change in resistance in response to changes in ambient temperature,
   a second electrical resistance element of a second platinum wire having a temperature-resistance characteristic that is the same as the temperature-resistance change in response to ambient temperature only, and
   means for maintaining the current flow through the first element at the level required to maintain a selected resistance ratio between the first and second elements, with the current level varying in response to changes of the first element as gas flows across the first element and the current level stabilizes at a level in response at the thermal conductivity of the gas during no-flow of the gas, and
   means for sensing each stabilized current level and for producing an output signal representing the thermal conductivity of the gas and the composition thereof.

8. Apparatus for analyzing the composition of gas, which comprises:
   a unidirectional flow passage for gas having alternate intervals of flow and no-flow;
   transducer means having a sensor positioned in the passage for producing a time-varying analog electrical signal that during each gas flow interval has a magnitude representing the flow rate and thermal conductivity of the gas and during each no-flow interval has a magnitude representing the thermal conductivity of the gas;
   a triggerable monostable multivibrator for producing a digital sample control signal;
   a D.C. restorer circuit and a zero crossing detector connected in tandem, the D.C. restorer circuit having an input for receiving the time-varying analog electrical signal, and the zero crossing circuit having an output connected to the multivibrator so that the multivibrator, in response to variations in the time-varying analog electrical signal, produces the digital sample control signal at the end of each gas flow interval; and
   sample-and-hold circuit means enabled by each sample control signal to detect the magnitude of the time-varying analog electrical signal during each succeeding no-flow interval.

9. A method of determining the composition of a gas having intermittent unidirectional flow comprising the steps of:
   generating an analog electrical signal having a time-varying waveform that during each no-flow interval has a substantially static magnitude representing the thermal conductivity of the gas, which magnitude is a function of the gas composition,
   detecting the onset of each substantially static portion of the time-varying waveform to produce a digital sample control signal; and
   sampling and holding the magnitude of the analog electrical signal in response to each digital sample control signal so that the magnitude so held during the intervals between successive digital sample control signals is indicative of the composition.

* * * * *